United States Patent [19]

Carlisle et al.

[11] 4,193,260

[45] Mar. 18, 1980

[54] COMBUSTION APPARATUS

[75] Inventors: Denis R. Carlisle, Risley; Andrew R. Grun, Tilehill, both of England

[73] Assignee: Rolls-Royce Limited, London, England

[21] Appl. No.: 827,108

[22] Filed: Aug. 23, 1977

[30] Foreign Application Priority Data

Sep. 4, 1976 [GB] United Kingdom ............... 36732/76

[51] Int. Cl.[2] ................................................ F02C 7/22

[52] U.S. Cl. ........................................ 60/737; 60/746; 60/759; 60/748

[58] Field of Search ............ 60/39.65, 39.71, 39.74 R, 60/39.74 B

[56] References Cited

U.S. PATENT DOCUMENTS

| | | | |
|---|---|---|---|
| 2,781,638 | 2/1957 | Fletcher et al. | 60/39.74 B |
| 2,999,359 | 9/1961 | Murray | 60/39.65 |
| 3,132,483 | 5/1964 | Lefebvre et al. | 60/39.65 |
| 3,283,502 | 11/1966 | Lefebvre | 60/39.74 B |
| 3,961,475 | 6/1976 | Wood | 60/39.74 R |
| 4,062,182 | 12/1977 | Fehler | 60/39.65 |

FOREIGN PATENT DOCUMENTS

| | | | |
|---|---|---|---|
| 2455909 | 5/1975 | Fed. Rep. of Germany | 60/39.65 |

*Primary Examiner*—Robert E. Garrett

*Attorney, Agent, or Firm*—Cushman, Darby & Cushman

[57] ABSTRACT

A combustion apparatus for a gas turbine engine comprises a combustion chamber having primary and secondary combustion zones, a fuel injector having a series of primary fuel nozzles and a series of secondary fuel nozzles, and primary and secondary fuel and air duct means to direct fuel and air mixtures to the primary and secondary combustion zones respectively.

2 Claims, 15 Drawing Figures

Figure 1:
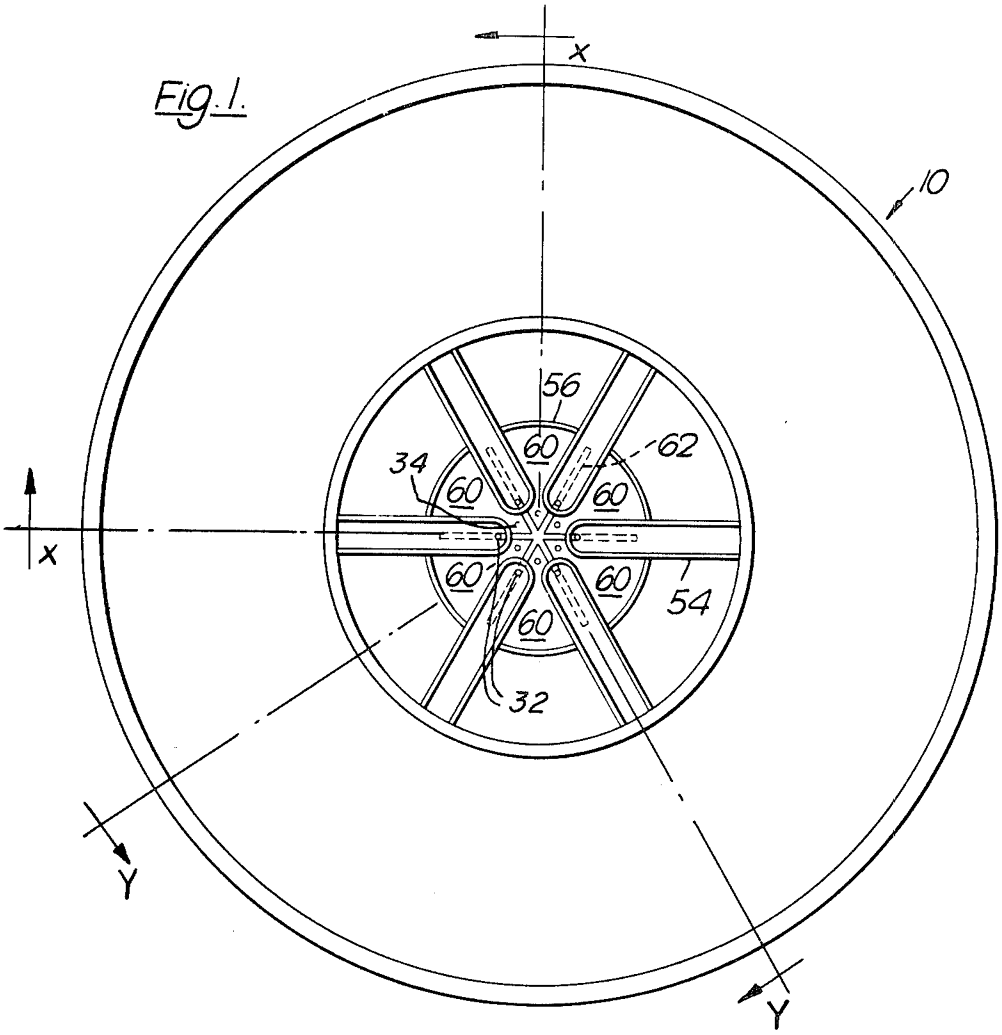

Fuel
Fuel Control
Engine Power Signal
16
18
20
21
22
24
12
100
28
30
32
34
26
50
104
112
110
10
102
14
114
106
56
54
116
58
B
III
68
63
64
66
52
108

COMBUSTION APPARATUS

This invention relates to combustion apparatus for use in gas turbine engines and is particularly concerned with providing such apparatus which will produce relatively low levels of nitrous oxide emissions. Various proposals have been made in which combustion chambers are provided with primary and secondary combustion zones, each zone having its own fuel and air supply. This type of system has become known as the staged injection system and generally requires a relatively complex arrangement of fuel pipes and nozzles to take the fuel to the separate zones, all of which have to be passed through the casing of the engine in which the combustion chamber is located.

The present invention seeks to provide a staged injection combustion apparatus in which the fuel supply and the means of conducting the fuel/air mixture to the primary and secondary combustion zones are relatively simple.

According to the present invention there is provided a combustion apparatus including a combustion chamber having primary and secondary combustion zones, a fuel injector having primary and secondary fuel injection means, and duct means arranged to direct an air and fuel mixture to each of the primary and secondary combustion zones.

The fuel injector may comprise an arm and a nozzle portion, the nozzle portion having a series of primary fuel nozzles and a series of secondary fuel nozzles, each series of nozzles being connected to a respective manifold which has a fuel supply duct in the arm of the fuel injector. The nozzles in each series are aligned with the respective duct means to direct an air and fuel mixture into the respective primary and secondary combustion zones.

The duct means for the primary combustion zone may comprise a series of scoops extending from the primary combustion zone to the fuel nozzle, the entrance to each scoop being aligned with a corresponding one of the primary fuel nozzles in the nozzle portion of the fuel nozzle to receive fuel and compressed air from the compressor of the gas turbine engine in which the combustion apparatus is located.

The duct means for the secondary combustion zone may comprise a tube extending from the fuel nozzle to the secondary combustion zone, the tube being divided into axially extending segments, the entrance to each segment being aligned with a corresponding one of the secondary fuel nozzles in the nozzle portion of the fuel nozzle to receive fuel and compressed air from the gas turbine engine compressor.

The exits from the segments may be shaped so that the fuel and air mixture flows into the secondary combustion zone transversely to the longitudinal axis of the combustion apparatus.

The combustion chamber may be fabricated so as to include a number of rings through which cooling air can flow and the flow of cooling air through the rings in the primary combustion zone may be such as to promote a swirling flow of air.

The flow of fuel to the fuel nozzle may have control means which control the flow of fuel in the supply lines to the fuel nozzle in such a manner that the overall air to fuel ratio in the combustion chamber is always at a predetermined value according to the power setting of the gas turbine engine.

Figure 3:
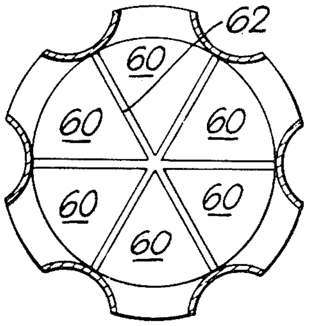
Figure 4:
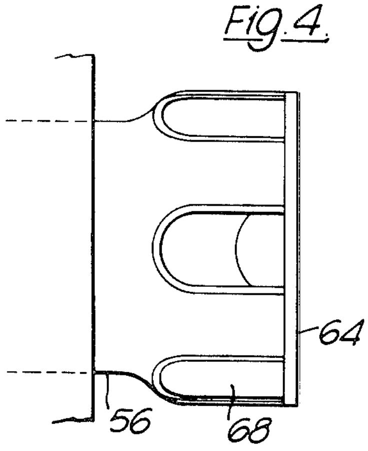
Figure 2:
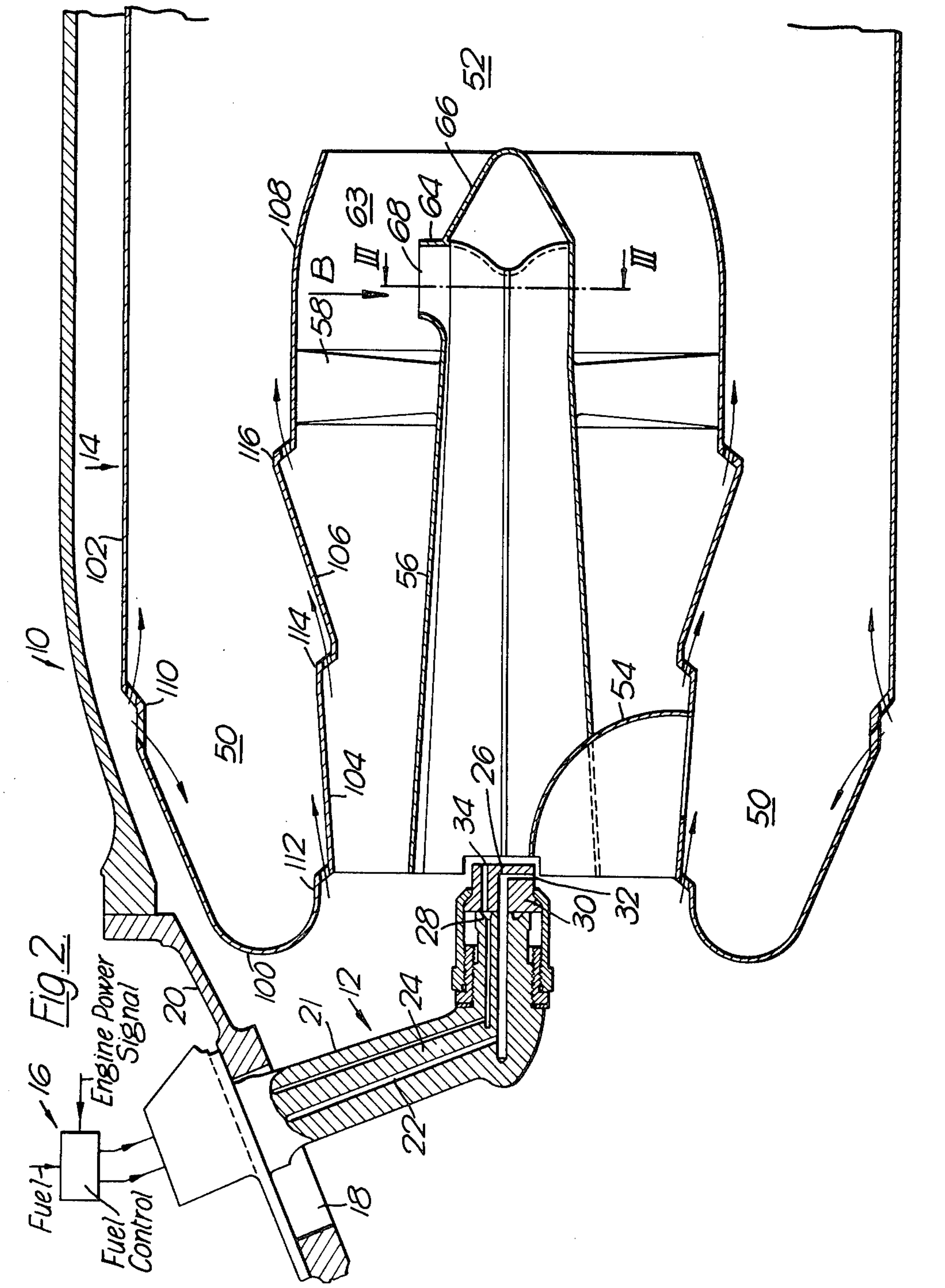
Figure 5:
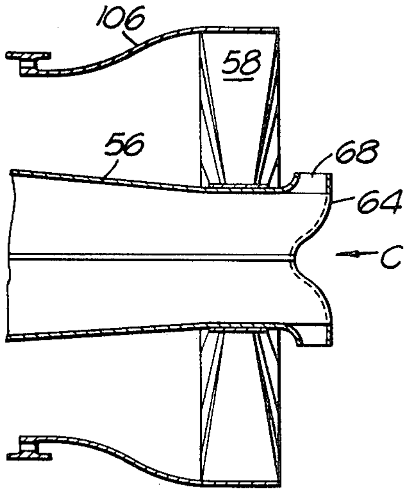
Figure 6:
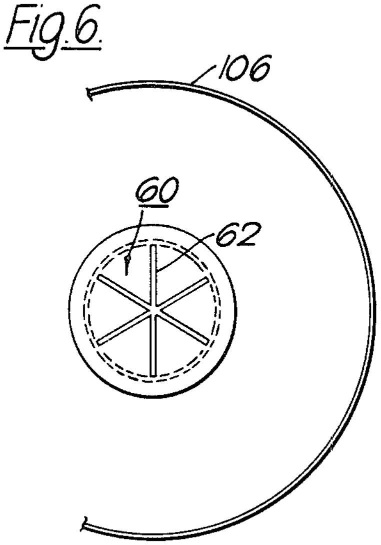
Figure 7:
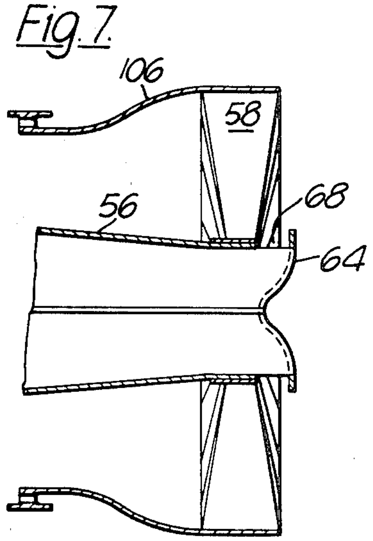
Figure 8:
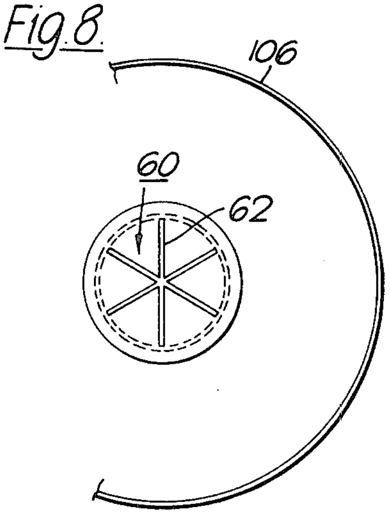
Figure 9:
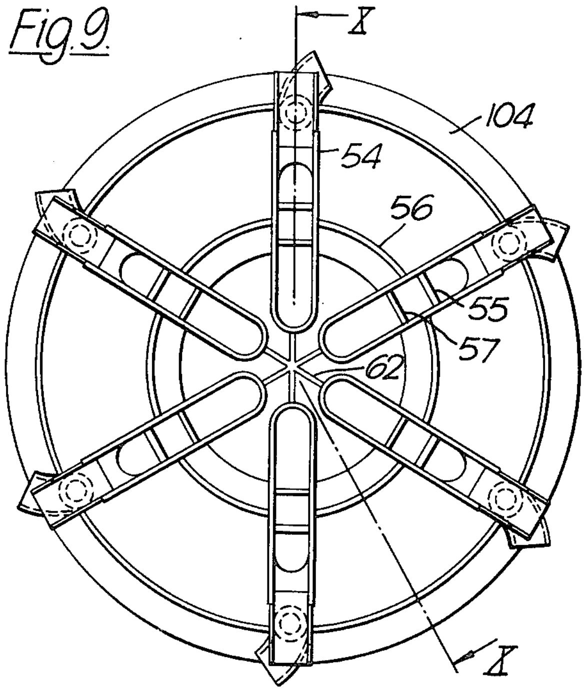
Figure 10:
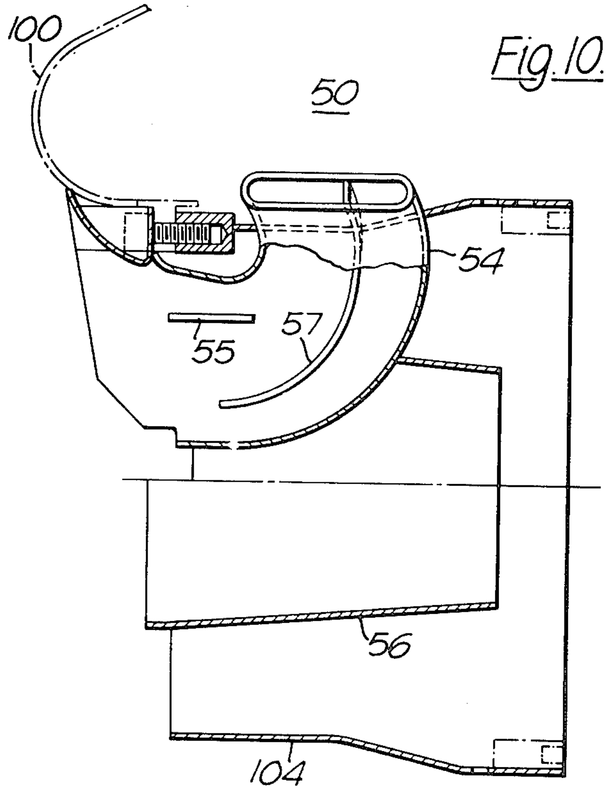
Figure 11:
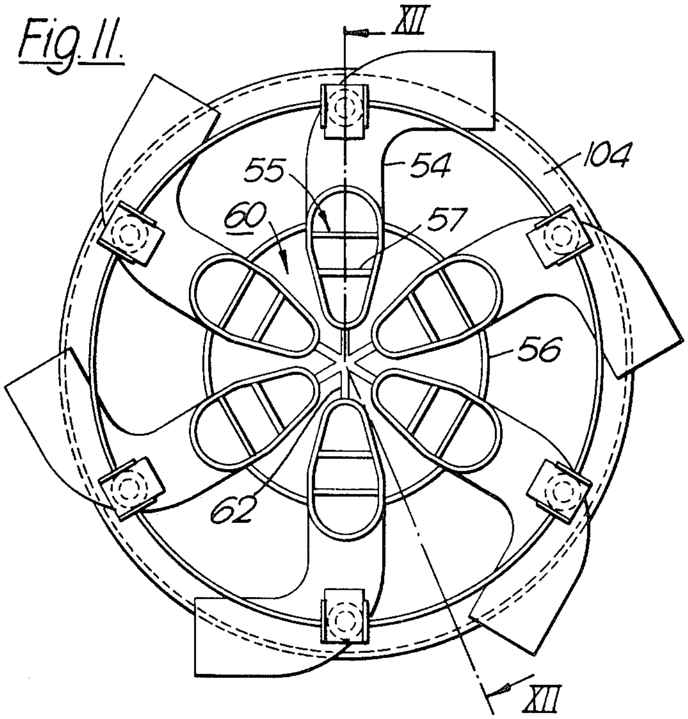
Figure 12:
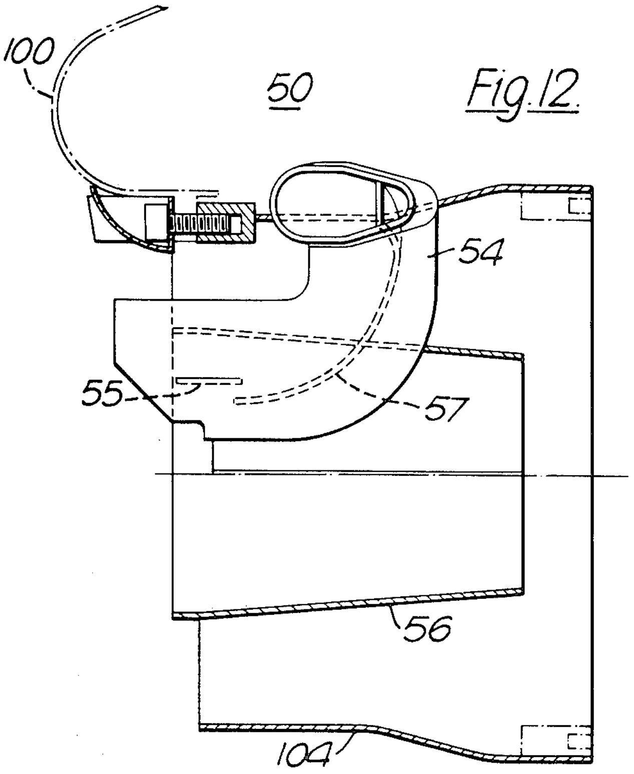
Figure 13:
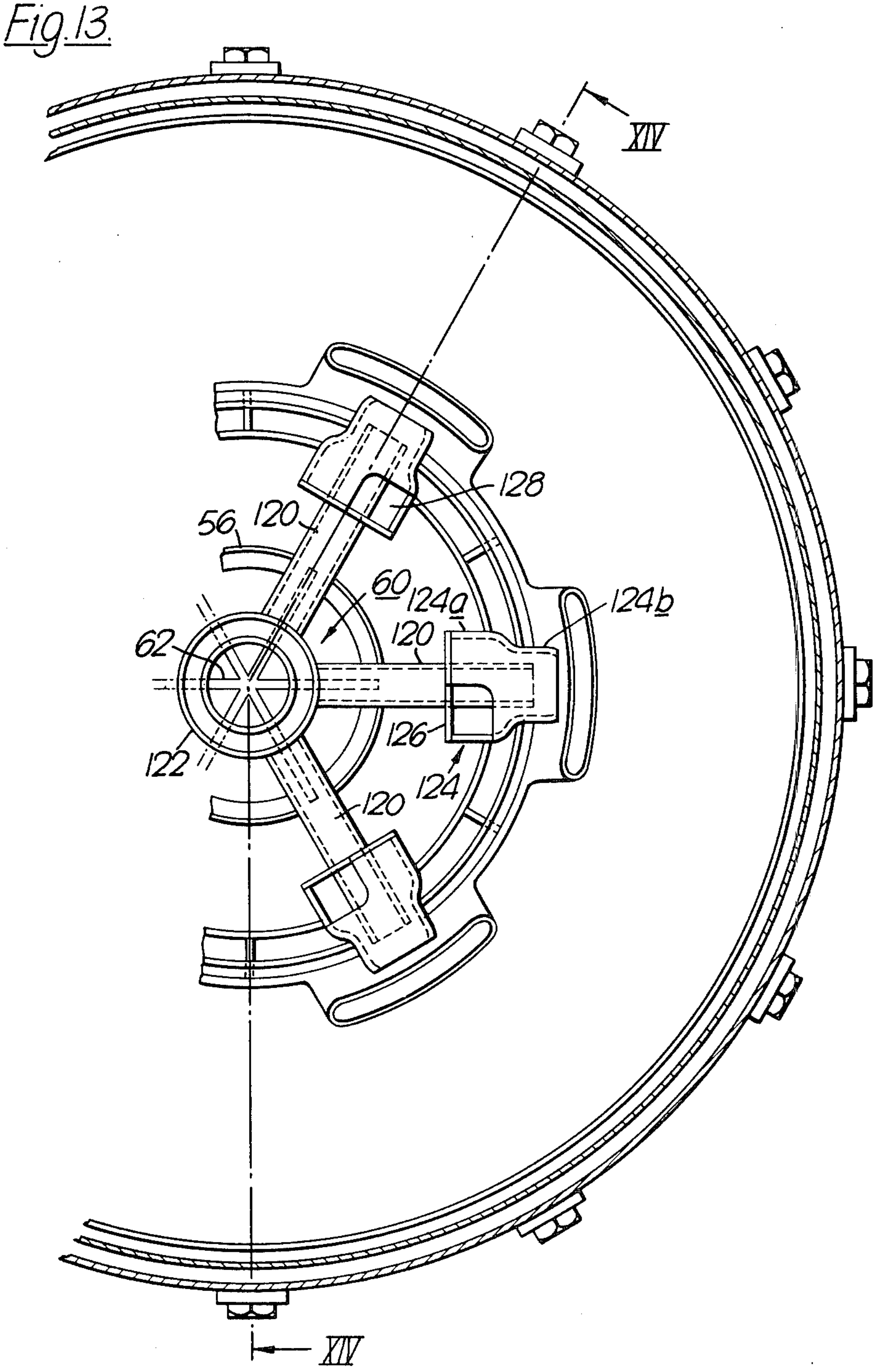
Figure 14:
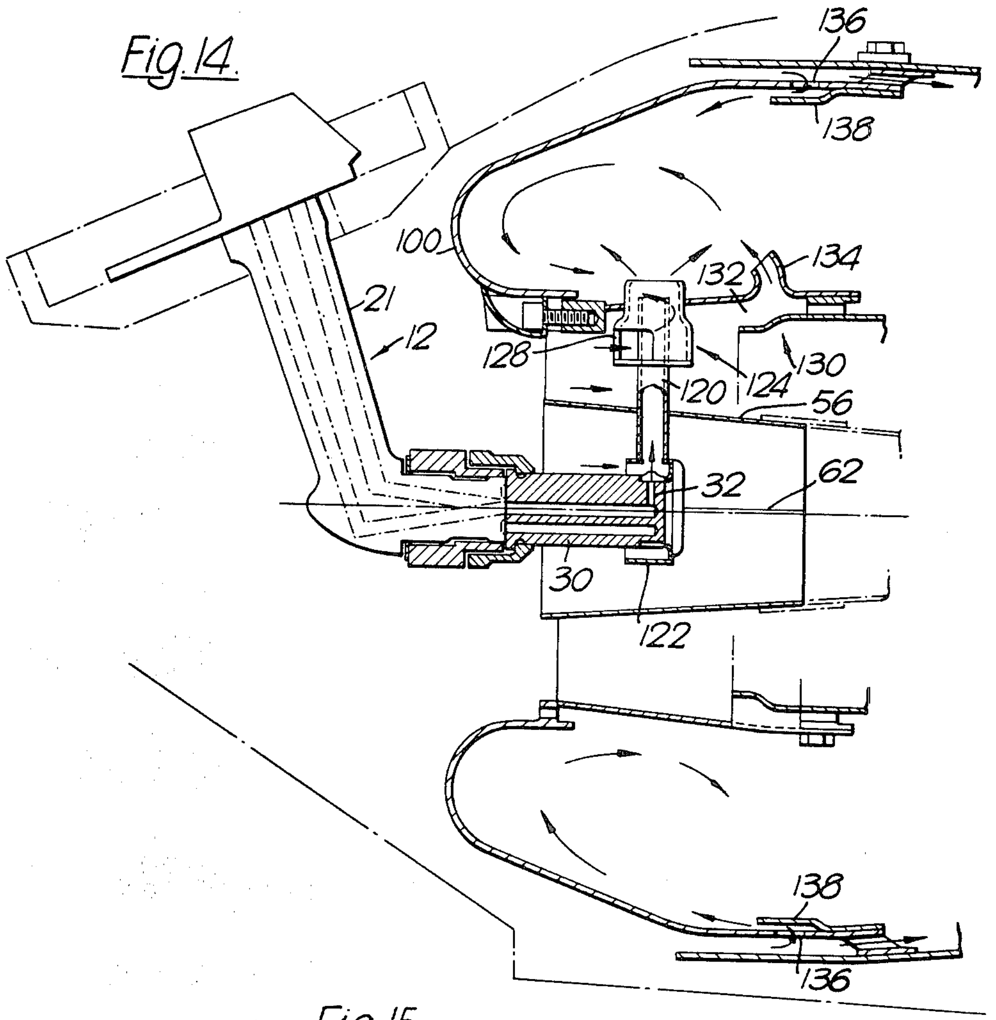
Figure 15:
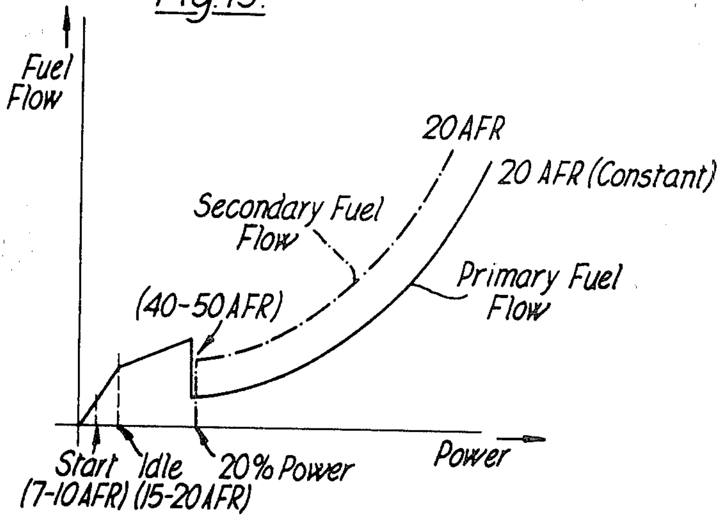

The present invention will now be more particularly described with reference to the accompanying drawings in which:

FIG. 1 is an end view of one form of combustion apparatus according to the present invention, FIG. 2 is a combined section along lines X—X and Y—Y in FIG. 1, FIG. 3 is a section on line III—III in FIG. 2, FIG. 4 is a view on arrow B in FIG. 2, and FIG. 5 shows an elevation of a modified form of combustion chamber to that shown in FIGS. 1 to 4 in which the main air casing is truncated, FIG. 6 is a view on arrow C in FIG. 5, FIGS. 7 and 8 correspond to FIGS. 5 and 6 respectively and show a modified form of the main air casing to that shown in FIGS. 5 and 6, FIG. 9 is a view similar to that shown in FIG. 1 but showing a modified form of primary air and fuel scoop, FIG. 10 is a section on line X—X in FIG. 9, FIGS. 11 and 12 correspond to FIGS. 9 and 10 respectively and show a modified form of primary air and fuel scoop to that shown in FIGS. 9 and 10, FIG. 13 is also a view similar to that shown in FIG. 1 but showing a further modified form of primary air and fuel scoop, FIG. 14 is a section on line XIV—XIV in FIG. 13, and FIG. 15 is a plot of primary and secondary fuel flow against engine power in a combustion chamber according to the present invention.

Referring to the FIGS., a combustion apparatus 10 includes a combined fuel nozzle 12, a combustion chamber 14 and a fuel control apparatus 16 to which further reference will be made later.

The combined fuel nozzle 12 passes through an aperture 18 in the casing 20 of a gas turbine engine, only a part of which is shown and is attached to the casing 20. The nozzle 12 has an arm 21 in which are provided a primary fuel duct 22 and a secondary fuel duct 24, the two ducts terminating in respective manifolds 26 and 28. The nozzle portion 30 of the nozzle 12 has a number of equi-spaced primary fuel nozzles 32 each connected to the manifold 26 and a number of equi-spaced secondary fuel nozzles 34, each connected with the manifold 28, the primary and secondary fuel nozzles alternating one with the other circumferentially. The outlets of the secondary fuel nozzles are directed parallel with the centre-line of the combustion apparatus whilst the outlets of the primary fuel nozzles are directed transversely to the centre-line of the combustion apparatus.

The combustion chamber 14 which is circular in section about the centre-line has an annular primary combustion zone 50 and a circular secondary combustion zone 52 downstream of the primary combustion zone. The primary zone 50 has a number of fuel and air scoops 54 which correspond in number to the number of primary fuel nozzles and each one of the scoops 54 in which some fuel and air mixing takes place is aligned with a corresponding one of the primary fuel nozzles to receive fuel therefrom. The scoops are elongate in cross-section as shown in FIG. 1 and extend from a point just upstream of the primary nozzles to a location in the inner wall of the primary combustion zone 50.

The fuel and air mixture is conducted to the secondary combustion zone through a tube 56 which is supported by a ring of swirler vanes 58. The tube is divided into segments 60 by radially extending partitions 62, the upstream end of each segment being aligned with a respective one of the secondary fuel nozzles 34 (see FIG. 1) to receive fuel therefrom. The tube 56 tapers inwardly in a downstream direction to prevent recirculations of flow stabilising within it and hence to pass the air/fuel mixture into the combustion chamber before it has time to ignite spontaneously, and is terminated by a blanking plate 64 and a cone 66. Each segment 60 has a flanged exit aperture 68 to direct the air/fuel mixture transversely across the flow exiting from the swirler vanes 58 and mixing takes place by this means within nozzle 63 prior to combustion in the secondary chamber 52. Heat conducted through the walls of the nozzle will assist fuel evaporation in the nozzle prior to combustion in the secondary zone 52. The swirl imparted to the air within the nozzle 63 by the swirler vanes 58 causes it to exit from the nozzle and pass into the secondary combustion zone 52 transversely to the centre-line of the combustion apparatus.

The combustion chamber 14 is fabricated from a number of generally circular section sheet metal elements which are attached together by means of cooling rings having apertures through which cooling air can flow.

The primary combustion zone is constructed of sheet metal elements 100,102,104,106 and 108 and cooling rings 110,112,114 and 116 and the flow of cooling air through the cooling rings 112 and 114 is arranged to promote a rotating flow of air/fuel mixture to prevent flame extinction. The flow of air through cooling ring 116 cools the nozzle 63 which is also cooled by the evaporation of fuel on the inner wall.

Referring to FIGS. 5 and 6, the casing defined by sheet metal elements 104 and 106 is terminated at the downstream end of the ring of swirler vanes 58 so that the air and fuel mixture issuing from the apertures 68 has a better penetration into the secondary combustion zone 52.

The arrangement shown in FIGS. 7 and 8 is very similar to that shown in FIGS. 5 and 6 except that the apertures 68 are formed in the wall of the tube 56 and the air and fuel mixture is directed outwardly by the flange of the blanking plate 64.

Referring to FIGS. 9 and 10 in order that the primary air and fuel mixture which flows through the scoops 54 can be more adequately mixed in the combustion zone 50, the primary air and fuel mixture instead of being directed radially into the zone 50, it is also given a rotational component by inclining the exits of each scoop 54, as shown in FIG. 9.

Additionally, each scoop can also be provided with a splash plate 55 and a splitter plate 57, which both extend across the whole width of each scoop. Fuel from the primary fuel nozzles impinges on the splash plates and the small droplets formed are picked by the high pressure air flowing through the scoops 54. The splitter plates 57 act both to guide the air flow through the scoops and to prevent fuel droplets from re-forming together into a sheet on the downstream walls of the scoops.

The arrangement shown in FIGS. 11 and 12 corresponds with that shown in FIGS. 9 and 10 respectively, the modification being that the scoops 54 have been re-shaped so that they now comprise two distinct sections, a radially extending portion and a tangential exit portion set at right angles to the radial portion. This arrangement means that the primary air and fuel mixture is given a greater rotational component as it enters the zone 50 compared with the design in FIGS. 9 and 10.

Referring to FIGS. 13 and 14, the scoops 54 are replaced with a number of equi-spaced radially extending tubes 120 each of which is aligned with one of the primary fuel nozzles 32 of the nozzle 12. Each tube 120 is connected to a manifold 122 which receives a proportion of the air required for the primary fuel and air mixture in order to carry the fuel from the nozzles 32 through the tubes 120. At the outer end of each tube 120 is a necked collar 124 having a relatively large diameter inner section 124*a* and a relatively smaller diameter outer section 124*b*. The inner end of the collar 124 is closed off by a plate 126 and a quadrant of the wall of the portion 124*a* is removed to provide an aperture 128 for the inlet of commpressed air.

Downstream of the tubes 120 is a further manifold 130 having an annular compressed air inlet 132 and a number of equi-spaced rearwardly directed outlet ducts 134 which correspond in number to the number of tubes 120 and which are aligned with the tubes 120 as shown in FIG. 13.

A further compressed air inlet is provided by a ring of apertures 136 in the wall of the element 100 and air flowing through these holes is directed rearwardly by a deflector ring 138.

The object of the design shown in FIGS. 13 and 14 is to reduce the droplet size of the fuel entering the zone 50 so that the fuel vapourisation is rapid. The compressed air entering the apertures 128 is swirled and accelerated inside the collar 124 and picks up the fuel and air issuing from the tubes 120. The swirling fuel and air mixture enters a toroidal vortex which is generated by the air from the outlet ducts 134 assisted by the air flowing through the apertures 136. The swirling action within the collar assists in reducing fuel droplet size and the injection of the swirling fuel and air mixture into the toroidal vortex assists in mixing the fuel and air.

In operation for all the arrangements described, at start-up fuel is pumped only through the primary fuel nozzles so that the air to fuel ratio (AFR) is in the region of 7–10, as the engine power is increased to idle the AFR is increased to a value between 15 and 20; the engine power is increased to about 20% of maximum and the AFR becomes reduced to about 7. At this power setting the primary fuel is reduced in a step change which gives a primary AFR of about 20 the surplus fuel being directed into the secondary fuel supply. The object of the step change is to introduce the fuel into the secondary burning zone at a mixture strength which is not too lean to burn efficiently. The secondary AFR will now be in the region 40–50 AFR. The primary AFR is maintained constant at 20 AFR up to full power by the control apparatus 16 at which condition the secondary mixture strength will have reached 20 AFR by design.

The fuel control apparatus 16 is arranged to control the flow of fuel as described above in dependence of a signal indicative of engine power.

We claim:

1. A combustion apparatus for a gas turbine engine comprising:

a combustion chamber having generally annular outer and inner walls joined at their upstream ends, said inner wall being of lesser length than the outer and said chamber having a primary upstream combustion zone located generally between said walls and a secondary combustion zone located generally downstream of said inner wall;

a fuel injector having a plurality of primary fuel nozzles and a plurality of secondary fuel nozzles;

a plurality of primary duct means arranged to receive fuel from respective ones of said primary fuel nozzles along with compressed air and to direct the resulting primary fuel and air mixture to said primary combustion zone;

a plurality of secondary duct means contained within said inner wall and arranged to receive fuel from respective ones of said secondary fuel nozzles along with compressed air and to direct the resulting secondary fuel and air mixture into said secondary combustion zone;

tube means extending from adjacent said secondary fuel nozzles to adjacent said secondary combustion zone and spaced from said inner wall, each of said plurality of secondary duct means comprising a longitudinally extending segment of said tube means aligned with a respective one of said secondary fuel nozzles, each said segment having an outlet for the secondary fuel and air mixture which is directed radially outwardly from the axial-center line of the combustion chamber; and air swirling means located between said tube means and said inner wall upstream of said segment outlets.

2. A combustion apparatus as claimed in claim 1 in which the inner wall of the combustion chamber terminates at the downstream face of the air swirling means.

* * * * *